Patented June 3, 1941

2,244,196

UNITED STATES PATENT OFFICE 2,244,196

CATALYTIC PRODUCTION OF HYDROCARBONS

Wilhelm Herbert, Frankfort-on-the-Main, Germany, assignor to American Lurgi Corporation, New York, N. Y., a corporation of New York No Drawing. Application November 26, 1937, Serial No. 176,761. In Germany December 2, 1936

6 Claims. (Cl. 260—449)

The present invention relates to improvements in the catalytic conversion of gases containing mixtures of carbon monoxide and hydrogen into hydrocarbons of higher molecular weight containing more than one carbon atom, principally those of paraffinic and olefinic nature, at temperatures below that at which methane would normally be exclusively formed in the presence of a catalyst suitable for forming methane from such gases at substantially atmospheric pressure.

According to the invention a higher pressure than 2 atmospheres is applied to the conversion and the stronger reaction provoked by the application of the said superatmospheric pressure is counteracted or compensated by the application of at least one of the following means: a diluted synthesis gas, diluted metallic catalysers, diluted activator content of the said catalysers, of high gas velocities and low temperatures to such a degree that if the conversion of the said gases would be performed under atmospheric pressure without changing any other condition of reaction yields would only be received which were substantially below the attainable maximum yields preferably below 100 grammes of liquid or solid hydrocarbons per normal cubic metre of the synthesis gas calculated on a 100% carbonoxide and hydrogen-containing gas.

The present invention relates more particularly to the use of such higher pressures with the simultaneous modification of the factors detrimental to the catalytic conversion in such a way that, despite the use of super-atmospheric pressures, a detrimental formation of methane is avoided during the catalysis under pressures of, for example, 7 to 15 atmospheres and over. According to the invention, the composition of the known catalysts for the Fischer-Tropsch benzine synthesis is modified in such a manner that their activity as regards the formation of methane appears lessened, when they are used under atmospheric pressure. Furthermore, according to another feature of the invention, the gas composition of the synthesis gas—which as a rule contains up to 30% of carbon monoxide and up to 60% of hydrogen—is modified in such a manner that a dilution of the gases takes place, for example by increasing the inert gas components. The dilution of the synthesis gas to form a gas containing over 20% of inert gas components may be effected in the most diverse ways, for example by using for the synthesis under high pressure, in accordance with the present invention, an end gas produced in the known benzine synthesis under atmospheric pressure by the Fischer-Tropsch method, or by subjecting the end gas produced in the methanol synthesis to the pressure synthesis in accordance with the present invention. Finally, the dilution of the synthesis gas may be achieved simply by constantly recycling the end gas produced in accordance with the process of the invention into the current of fresh gas.

The two measures for the modification of the composition of the catalyst and the gas composition of the gas prepared for the synthesis may be combined together and with the conditions of temperature and pressure in manifold ways, particularly when the catalysis is carried out in a plurality of stages, which may at the same time be stages of different pressure.

The individual catalysts, gas compositions, recycling of the gases, temperatures and pressures to be employed for the pressure synthesis of the invention, and also the connection of the various contact stages, are described in greater detail below.

It has already been attempted to carry out the catalytic conversion of carbon monoxide and hydrogen-containing gases into hydrocarbons, principally of a paraffinic and olefinic nature, under elevated pressures of over 2 atmospheres. In this operation, however, such an intensive formation of high boiling products, which clog the pores of the catalyst, occurred that the activity of the contact mass was destroyed in a very short space of time. (Cf., for example, the publication "Brennstoffchemie" vol. 12, No. 19, and vol. 14, No. 1.) If at the same time the reaction temperature is increased, the catalyst will certainly remain active for a longer period, but undesirable water-soluble products, alcohols, acids and the like, are formed, which destroy the plant and thus jeopardise the practicability of the process.

The catalysts which were used hitherto in carrying out the synthesis, usually consist of a metal or mixture of metals having a hydrogenating action, for example cobalt or nickel. In addition, they contain metal compounds (for example of an oxidic nature, such as oxides, carbonates or the like), which can be reduced only with difficulty or not at all with hydrogen. These metal compounds raise the yield considerably above the degree that may be attained by the metal of the catalyst alone. They are referred to hereinafter as activators, for the sake of brevity. This actual catalyst (metal or mixture of metals plus activators) is deposited, finely divided, on a carrier mass, for example kieselguhr, silica gel, active carbon or the like, and the resulting product forms the contact mass.

It is known that the percentage of activators, referred to the metallic portion of the catalyst, must be kept within definite, fairly narrow limits with a view to obtaining high yields; cf. "Brennstoffchemie", vol. 12, page 225, 1931. In that publication the optimum content of thorium oxide in a cobalt-thorium catalyst is given at 18% of $ThO_2$. With either a lower or a higher content the yield and also the life of the contact fall off considerably.

It has now been ascertained that the synthesis under elevated pressure, for example 1 to 20 atmospheres positive pressure and over, which heretofore has not been successful in practice, may be carried out with complete success if the percentage of activators in the catalyst is substantially reduced beneath the optimum content for normal conditions of pressure.

For example, in the synthetic production of hydrocarbons from carbon monoxide and hydrogen at a pressure of 10 atmospheres, a catalyst was used which contained only 12% of thorium oxide or, if desired, only 5% of thorium oxide, referred to the metallic cobalt present. With this contact material a yield of 130 grms. of liquid products was obtained per standard cubic metre of synthesis gas. At the same time it was found to be convenient greatly to dilute the catalyst relatively to the carrier material. For example, the aforesaid cobalt-thorium oxide catalyst, according to the invention, contained only 25 grms. of cobalt per litre of volume of the loose contact material. Catalysts with higher or lower cobalt and thorium contents may be used. According to the invention it is absolutely necessary, however, that the cobalt and thorium contents, or at least one of them, should remain beneath the limit that is necessary for obtaining optimum yields in the synthesis under normal pressure. Otherwise the contact material is contaminated very quickly, often after only a few hours.

The life of the catalyst can be still further improved in the process according to the invention, by maintaining the amount of alkali metal or alkaline earth metal oxides or carbonates in the contact mass (catalyst plus carrier substances) below 1% preferably below 0.2%. In special cases it may even be advantageous to employ contact materials completely free from alkali, or even acid contact material, for example, material containing phosphoric acid or boric acid. Furthermore, the life of the contact material may be prolonged by keeping the content of iron in metallic or oxidic form less than 3%, referred to the total weight of the contact material, and preferably less than 0.2%.

If thorium oxide is replaced by other activators, for example oxides or carbonates of uranium, aluminium, magnesium manganese, zirconium, beryllium, cerium, titanium, chromium or zinc, the amount of such activators contained in the catalyst will be reduced, in accordance with the invention, in the same manner. The rule generally applies that the content of such activators must decrease as the pressure used for the synthesis rises.

It is often advantageous to work with very low contents of activators, or merely with metals having a hydrogenating action, reduced below the melting temperature. A catalyst suitable for the pressure synthesis may also be obtained by incompletely reducing the metal acting as a hydrogen acceptor in the production of the catalyst. For example, cobalt oxide precipitated on kieselguhr may be reduced in such a way that only 90–95% of the cobalt is converted into the metallic form. The efficiency of such catalysts naturally does not equal that of those described above.

According to the invention, furthermore, such activators may be employed as are out of the question for the synthesis under normal pressure, on account of insufficient activity. In addition, in accordance with the principles of the invention, the composition of the catalyst for the synthesis under elevated pressure may be so selected that in such process under elevated pressure a catalyst of weaker activity is used than in the synthesis under normal pressure.

In many cases it is advisable to form the contact material out of a plurality of layers, in each of which the catalyst possesses a different activator content; for example, the smallest content of activator is chosen at the point of entry of the gas and the greatest at the point of exit of the gas.

The yield and the life of the contact materials may, further, be increased by maintaining at the point of entry of the gas a lower temperature than in the other parts of the contact material or a part thereof; for example, the temperature may be allowed to increase from the point of entry of the gas either uniformly or in a stepwise manner.

With the foregoing catalysts of lesser activity it is also possible, under certain conditions, to modify the proportion of benzine in the liquid products obtained, in the direction of an increase in said proportion, the term benzine denoting those hydrocarbon compounds which boil below 200° C. at atmospheric pressure. The same effect is achieved by the use of diluted initial gases, the dilution being effected by increasing the inert constituents in the gas or by the admixture of recycled gas or by the admixture of the reaction products of the synthesis, or by adding steam, carbon dioxide or the like.

However, merely an excess of carbon monoxide or of hydrogen over the theoretical proportion of 1:2 may also be used. The proportion of benzine to oil may also be increased by suitable adjustment of the reaction temperature and the velocity at which the gas is passed through the contact material or by modification of the cooling. All these measures, which promote the formation of benzine, nevertheless lead, in pressureless synthesis, to a reduction of the total yield of liquid products referred to the standard cubic metre of synthesis gas treated. If, however, pressures of over 1.5 atmospheres, preferably from 10 to 100 atmospheres, are employed, then, in addition to an adequate life of the contact material, there is also produced an increase in the total yield of liquid products. By the application of the pressure, the specific amount of gas passed over the catalyst, referred to the unit of weight of the contact material, may also be quite considerably increased.

When used catalysts, which begin to lose their activity, are being used, the initial yield may be restored completely or almost completely, when working under pressure, if the velocity of the gas passed over the catalyst is increasingly reduced as the activity of the catalyst falls off. Furthermore, the lessening of the activity of the catalyst may be compensated to a certain extent by increasingly raising the temperature and/or the pressure. When working with diluted initial gas or with recycled gas under pressure, it is also possible to counteract the fall in the activity of the contact material by increasing the concentration of the carbon monoxide and/or of the hydrogen, by reducing the proportion of recycled gas in the total quantity of gas entering, for example.

*Example 1*

100 grms. of technical cobalt nitrate, contaminated with Ni, Fe, Cu, As or the like, are dissolved in water together with 20 grms. of thorium nitrate. 150 grms. of kieselguhr are stirred into the solution. The precipitation of the metals is then carried out with potassium carbonate solution while stirring vigorously. The precipitate is filtered off by suction filtration, washed with hot water and reduced with hydrogen at 350° C. This contact mass, partially contaminated with, in particular, Fe, Cu and As, yields, in the synthesis of a gas mixture containing carbon monoxide and hydrogen in the proportion of 1:2 at the optimum temperature of 230° C. and at atmospheric pressure, 8 grms. of oil and 40 grms. of benzine per standard cubic metre of originating gas. By the addition of diluting gases, for example nitrogen, methane, steam, the formation of oil and benzine falls off, while the formation of oil soon ceases entirely.

If, with the same contact material and the same gas, the operation is carried out at a pressure of 10 atmospheres and at a temperature of 200 to 220° C., 60 grms. of benzine and 70 grms. of oil per cubic metre of originating gas are produced. If the aforesaid diluting gases are added, the formation of oil falls off increasingly in proportion as the gas is added. However, the total yield of oil and benzine remains approximately the same when the velocity of gas passed over the catalyst is suitably selected, for example 2 standard cubic metres of gas per hour per kilogram of cobalt. The modification of the process of the invention aiming at the increasing of the formation of benzine, for example by the employment of diluted gases, has the advantage that the life of the contact material is increased to a multiple of its former value, for example to three months.

The diminishing of the activity of the catalyst may, furthermore, be achieved in accordance with the invention by producing a catalyst that contains relatively small quantities of active metallic substance. For example, in accordance with the invention, when a pressure of 3 atmospheres is to be used, a catalyst with a metal content of from 20 to 50 grms. per litre of loose volume is employed. For pressures of, for example, 10 atmospheres a catalyst containing from 5 to 25 grms. of active metallic substance per litre of loose volume is suitable. When working with a pressure of 100 atmospheres, these figures are changed to from 0.5 to 10 grms.

The amount of active substance contained in the catalyst, according to the invention, is advantageously adjusted not only to the pressure, under which the synthesis is carried out, but also depending on the composition of the gas to be treated. If the gas contains large amounts of oxides of carbon and hydrogen, a poor catalyst is employed, whereas for gases containing small amounts of oxides of carbon and hydrogen richer catalysts may be used within the scope of the invention.

The process of the invention may also be used when working with a plurality of stages, both when the same pressure is used in all of the stages, and when different pressures are maintained in the different stages. When working with the same pressure in all stages, a somewhat richer catalyst is preferably employed in the succeeding stage than in the first stage. For example, the activity of the catalysts in the various stages is so selected that it increases by stages approximately in the same degree as the amount of oxides of carbon and hydrogen contained in the working gas. In the same manner, the process of the invention may be carried out when the pressure in the succeeding stages is higher than in the first stage, but in this case it is often convenient to employ catalysts of about the same activity in all stages. If the stage working at a positive pressure is preceded by a stage that is operated at atmospheric pressure, it is naturally possible to work in the latter stage as customary heretofore.

The invention may also be modified in the sense that, instead of using fresh catalysts with the low metal content according to the invention, catalysts the activity of which has been affected by use, with a higher content of active metals, may be employed, which would still supply approximately the same amounts of synthesis products as the former, in the synthesis at atmospheric pressure. Catalysts, the activity of which has been intentionally impaired, or catalysts produced in other ways and having a similarly low activity, which are little suited and uneconomical for the synthesis under atmospheric pressure, may also be used according to the invention. It is found, unexpectedly, that such catalysts possess full, or even greater efficiency when used for the synthesis under pressure.

Whereas, for example, a catalyst may be regarded as unsuitable and no longer usable for synthesis at atmospheric pressure, when it yields less than 70–80 grms. of liquid products per standard cubic metre of technical working gas containing about 80–90% of $CO+H_2$, such catalysts are excellently suited for synthesis under elevated pressure. For example, a catalyst yielding 70 grms. at atmospheric pressure, yields 85 grms. of liquid products at a pressure of 2 atmospheres. Yields of 70 grms. and less under atmospheric pressure and optimum conditions are provided by the foregoing fresh catalysts with a low content of active metal, if they are suitable for the process of the invention. If the pressure is increased, it is possible to employ with particular advantage, for example, catalysts which yield 40 grms. and less under atmospheric pressure and optimum conditions. At 10 atmospheres, for example, the yield is then again increased to over 80 grms., with a good life of the catalyst.

If a plurality of catalysts are serially arranged, it is possible to use, at the points which are traversed last by the reaction gas, catalysts with such great activity that in the processes known hitherto they would be exhausted in a very short space of time. For example, in the last layers or furnaces connected in series of catalysts with contents of 80 grms. and more, per litre of loose volume, of active metallic substance may be employed, or catalysts which consist entirely of metal, like the so-called alloy skeleton catalysts (cf. the periodical, "Brennstoffchemie," vol. 15, 1934, page 84 onwards).

The variation of the activity of the catalysts in the various layers or contact stages may, finally, be advantageously effected by converting in every layer or stage equal quantities by weight of the reacting gas constituents, referred to the unit of capacity of the contact mass.

Instead of reducing the activity of the catalysts, or in addition to this measure, the synthesis gas undergoing reaction may be diluted, i. e. its content of inert gas constituents may be increased beyond the usual degree, to 20% or more. Experiments have already been carried out with diluted synthesis gases, which exhibited degrees of dilution referred to a 100% mixture of carbon monoxide and hydrogen, of 20 and 40% by the addition of nitrogen, methane and carbon dioxide. (Cf. "Journal of the Soc. of Chemical Industry Japan," vol. 37, 11, pages 704/716B). The yields of liquid products in cubic centimetres obtained in these experiments per cubic metre of synthesis gas did not reach the yields of a high per cent synthesis gas with a customary $CO:H_2$ ratio such as 1:2. On the contrary, it was ascertained that the greatly diluted gases had a considerably harmful effect on the benzine synthesis, and that as the dilution of the originating gas increased, the synthetic benzines produced gradually became more volatile and lighter (cf. above literature, page 711B).

It has now been found that the same, and even better results are obtained in the conversion of carbon monoxide and hydrogen to liquid hydrocarbons by the known catalysts of the Fischer-Tropsch benzine synthesis, if the content of inert gas components in the synthesis gases is increased beyond the degree hitherto usual, for example over 20%, and at the same time the synthesis is carried out under superatmospheric pressure (over 2 atmospheres) and at temperatures that are lower than those necessary for the exclusive formation of methane. At the same time, the dilution of the originating gas is preferably made greater in proportion as the pressure employed is greater, or conversely, when the dilution is great, a high pressure is chosen.

A diluted synthesis gas may also be produced in most simple manner, according to the invention, by first starting in known manner with a normal technical synthesis gas containing about 12% of inert gas constituents, and causing the same to react under atmospheric pressure with the known catalysts of the Fischer-Tropsch benzine synthesis, as described, for example, in the periodical "Brennstoffchemie" 1932, vol. 4, p. 61 onwards. The resulting end gas, after separation of a portion or all of the reaction products formed, is now compressed, in accordance with the invention, in the thus diluted form in respect of its content of carbon monoxide and hydrogen, and converted in a second contact furnace, if desired in a plurality of stages, under elevated pressure with the same known catalysts (for example 33% of Co, 6% of $ThO_2$ and 61% of kieselguhr).

The end gas produced in the methanol synthesis may also be advantageously employed as a diluted originating gas, since said end gas contains carbon monoxide, hydrogen, carbon dioxide, methane and nitrogen, and is already under the high pressure of the methanol synthesis (over 100 atmospheres). In accordance with the invention, therefore, the known methanol synthesis, which takes place at temperatures above 250° C. and at pressures over 100–200 atmospheres, is followed by a benzine synthesis under pressure and at temperatures below 300°, preferably between 180 and 260°. For example, the residue gas of the methanol synthesis, produced under 200 atmospheres, which contains about 15–25% of CO, 10–20% of $H_2$ and 20–30% of $CH_4$ (the rest consists of carbon dioxide-nitrogen), may be reduced in pressure in a compressor, to the working pressure of, for example, 20 atmospheres required for the benzine synthesis, with the performance of work and, if desired, the production of cold. The cold gas can then be brought to the temperature suitable for the second stage of the process according to the invention, namely the benzine synthesis, with utilisation of the heat of reaction of the methanol synthesis, and then passed to the contact furnace for catalytic conversion into paraffinic and olefinic hydrocarbons. On passing out of this furnace, all or a part of the reaction products, preferably also the carbon dioxide, are extracted, in order to raise the partial pressure of the carbon monoxide and hydrogen not yet converted. This gas can now be recycled back to the contact furnace together with fresh gas, or it is subjected by itself once more to the same synthesis in a second contact stage.

Most technical combustible or inert gases and vapours may also be used as diluting media.

Particular advantages are obtained when using such admixture gases or vapours as may easily be removed from the end gases with the usual technical means, and thus do not unnecessarily burden the succeeding plant for the separation of the reaction products. Such substances are, for example, $CO_2$, $H_2O$, alcohols, higher hydrocarbons, and so forth. Furthermore, it is advantageous to use as diluents such substances as occur in the reaction as less desirable by-products of the synthesis (for example $CH_4$, $CO_2$ and the like). In this way, depending on the mixture ratio, it is not only possible to improve the practicability of the synthesis under pressure, but also to control the reaction to a certain degree. If higher hydrocarbons, for example benzine vapours, are added to the synthesis gas, it is possible to control the reaction in the direction of an increased production of oil or paraffin; the same applies to the admixture of gas oil vapours. In addition, the life of the catalyst is increased by the addition of benzine vapours to the synthesis gas, because the high boiling substances which are injurious to the activity of the contact material are automatically extracted therefrom to a certain extent.

The present process can be employed with particular advantage in cases where a further use of the synthesis gases freed from the reaction products is intended, such as use as illuminating gas or as originating gas for the fresh production of synthesis gas. The gas constituents still missing or present to an inadequate degree in the end gas may then be added to the synthesis gas as diluents before the synthesis gases enter the contact furnace. With this measure two effects are thus achieved, namely an improvement of the reaction layer in the contact furnace and the production of an end gas utilisable for other useful purposes.

It has been ascertained quite generally that the content of admixed gases or vapours desirable in the interests of a smooth reaction may be higher in proportion as the pressure used for the reaction is higher. The surprisingly favourable effect of diluted gases or vapours in carrying out the synthesis under pressure was by no means to be expected; because in carrying out the synthesis under normal pressure the aim is to keep the concentration of the actual synthesis gas as high as possible. When working with diluted gases at normal pressure, a considerably lessened yield of liquid products is obtained, as is described in literature in many quarters.

The process of the present invention may also be employed in conjunction with existing plants working with normal pressure, by compressing and subjecting to a pressure synthesis the end gases of a normal synthesis stage, which, after removal of the reaction products, are poor in respect of the content of non-converted synthesis gases. A far better total yield is obtained thereby than when the end gases, after separation of the reaction products, are sent on in the manner customary heretofore through a second contact furnace at atmospheric pressure.

In addition to the use of the means described in the foregoing, the present invention may also be put into practice by recycling the end gas of the reaction, after partial or complete separation of the reaction products, at the same time diverting any excess. The admixture of the fresh gas to the recycled gas need not necessarily be effected before entry into the contact furnace; it is, in fact, possible, with particular advantage, to effect the admixture of the fresh gas about in the middle of the reaction zone, or distributed stagewise over a plurality of reaction zones. A more uniform distribution of the reaction over the whole contact furnace is thereby achieved, while otherwise the main reaction is concentrated on the zone of entry of the gas, when, in turn, the danger of overheating and the increased formation of undesirable by-products occurs.

Example 2

A gas of the following composition was utilised as the originating gas for the synthesis: 20% of $N_2$, 7% of $CO_2$, 10% of $CH_4$, 21% of $CO$, and 42% of $H_2$.

After passing this synthesis gas over a contact material consisting of 33% of Co, 6% of $ThO_2$ and 61% of kieselguhr, at 190° C. and at a gas velocity of 1.6 normal litres per gram of CO in the contact mass per hour, a yield of benzine, oil and paraffin, i. e. of liquid products, of 68 grams per normal cubic metre of originating gas was obtained, when working at atmospheric pressure (normal pressure). If the conversion is carried out in the same contact furnace, in accordance with the invention, at 12 atmospheres, a yield of liquid hydrocarbons of 88 grams per normal cubic metre is obtained, by keeping the temperature lower in accordance with the higher pressure (180° C. instead of 190° C.). If the same originating gas is catalytically converted at a pressure of 60 atmospheres and a temperature of 174° C. with the same contact material, the yield of the aforesaid liquid hydrocarbons is increased to 96 grams per normal cubic metre.

A further advantage of the invention consists in the fact that raising the pressure during the course of the catalysis facilitates to an extraordinary extent the separation of the valuable reaction products. The separation of other substances from the end gases of the synthesis stages working at normal or elevated pressure, and also from the residue gases left over after the last stage of the synthesis—if this is required to be done—likewise takes place more easily. Thus, for example, by using an elevated temperature behind the first stage or the first part of the catalysis, all the oil and a large proportion of the benzine—and all the benzine and all the gasoil if the pressure is raised to a sufficiently great extent—can be separated, and the washing out of carbon dioxide can be carried out in most simple fashion by means of water under pressure. An equally simple method of working is also possible for the end gases behind each successive stage. Instead of separating the reaction products merely by the use of pressure, combination working is naturally also possible, for example by the application of pressure and cold—if desired in a plurality of stages—or by the use of absorption or adsorption plants, each of these plants being capable of use alone or in combinations of two, more, or all together. With a view to obtaining a particularly facilitated separation of the reaction products, the pressure between the two parts or individual stages may also be forced up higher and a reduction in pressure be effected before entry into the next part or next reaction stage, when a recovery of the energy liberated during the pressure reduction is preferably carried out in known manner for the purpose of reducing the power required by the compressors.

The pressure in the pressure part of the catalysis can be variously selected. It is convenient to make the pressure so high that the partial pressure of the gas constituents undergoing reaction in these stages (carbon monoxide and hydrogen) corresponds at least to the partial pressure in the originating gas in the synthesis under atmospheric pressure. If, for example, the end gas of the first stage, working at about 1 atmosphere, still contains 30% of $CO+H_2$ as compared with 90% of $CO+H_2$ in the originating gas, the following stage works, in accordance with the invention, at, for example, at least 3 atmospheres. If a third stage is also provided, the pressure therein is kept over 4½ atmospheres, for example 5—6 atmospheres, in accordance with the invention, for a content of $CO+H_2$ of, for example, 20%.

The reaction temperatures in the stage or the stages of the pressure part of the catalysis may be made equal to those that are customary for the synthesis under atmospheric pressure. But lower or higher temperatures may also be employed. This depends, for example, on the condition of the contact mass and the pressure.

In general, lower temperatures will be used with a fresh contact mass and at a higher pressure, while with a lower pressure or old contact mass a higher reaction temperature is preferable. The process of the invention can also be used with those methods of working in which gas is recycled within one or more stages.

Example 3

If a synthesis gas of the composition: 4% of $N_2$, 2% of $CO_2$, 4% $CH_4$, 30% CO and 60% $H_2$ (so-called fresh gas) is passed over the same catalyst as that described in Example 2, at atmospheric pressure, and if this normal synthesis gas is diluted with the end gases resulting from this pressureless synthesis by recycling methods, a diluted synthesis gas according to the invention is obtained, composed approximately of 10% of $N_2$, 6% of $CO_2$, 17% of $CH_4$+homologues, 22% of CO and 45% of $H_2$. If once again the velocity of the gas passed over the catalyst is kept at 1 normal litre per gram of cobalt per hour, referred to the fresh gas, 95 grams of liquid hydrocarbons per normal cubic metre of fresh gas are obtained at atmospheric pressure and 190° C., while at a pressure of 12 atmospheres and a temperature of 180°

C. 121 grams, and at 60 atmospheres and 174° C. as much as 138 grams per normal cubic metre of fresh gas are obtained. If, finally, the pressure is increased to 200 atmospheres, it is advisable still further to increase the dilution of the gas on entry into the contact furnace, for example by more intensive recycling of the end gas, so that the gas has approximately the following composition:

20% of $N_2$, 13% of $CO_2$, 42% of $CH_4$
8% of $CO_2$ and 17% of $H_2$

With this rarefied gas, at 170° C. and under the same conditions as regards the catalyst, 148 grams of liquid hydrocarbons are then obtained per normal cubic metre of fresh gas.

If, as mentioned at the beginning, the rarefaction of the synthesis gas is obtained by first subjecting a normal synthesis gas (with 10% of inert gases) to a pressureless benzine synthesis with the known catalysts, the further treatment of this end gas in a second contact stage, according to the invention, under elevated pressure, may be varied in the most diverse ways. Both the pressureless part and the pressure part of the synthesis may be subdivided into a plurality of stages, and the separation of the products of the catalysis is possible within and/or at the end of each part. It is also possible to work by carrying out a complete or partial separation of the reaction products formed only in the pressure part or after same.

A further considerable advantage of the process of the invention consists in the fact that, by occasionally reducing the pressure of individual contact furnace elements of the pressure part, a regeneration of the contact mass may be obtained. This is done, for example, by operating individual furnace elements of the pressure part of the synthesis, for the purpose of regenerating the contact mass, temporarily with the same gas but at substantially lower pressure—which may be lowered to atmospheric pressure and lower. In this way an excellent regenerative effect is obtained. The latter may be still further increased by passing the gas (when working with gas at reduced pressure) in the opposite direction through the contact mass to that of the normal reaction gas.

It is known to effect steaming out with steam for the regeneration of exhausted contact masses. Use may also be made of this measure in the process of the invention, for example by adding steam, hydrogen or the like to the reaction or regenerative gas, for a shorter or longer time, in one stage or stage part of the synthesis, or by using said gaseous media alone for the steaming out. This steaming out can be carried out in the process of the invention, for example in the contact furnaces of the pressure part, with or without positive pressure or in a vacuum. In many cases the best effect is obtained in all stages, when steaming out, with the lowest possible pressure or reduced pressure. The steam is preferably used for this purpose in a superheated state and as far as possible the operation is carried out in countercurrent flow or transversely to the normal direction of the reaction gas.

In order profitably to utilise the end gas resulting from the aforedescribed catalytic conversion of carbon monoxide and hydrogen containing gases, which still contains carbon monoxide and hydrogen, said end gas is preferably again subjected to the same catalytic conversion in a contact furnace. The end gas still contains on an average about 10% of carbon monoxide and 20% of hydrogen, after it has passed through one or more contact furnaces with multiple recycling. If this gas, which represents a 30% synthesis gas, is passed into a second contact furnace working without recycling, 30–40 grams of higher hydrocarbons may still be produced per cubic metre of end gas. If recycling were also employed in this second furnace, 20 grams of products would still be produced at the best, quite apart from the more expensive method of operation of recycling. In view of the low synthesis content of the end gas of the first stage, the second stage will preferably be operated with longer treatment times, higher temperature, higher contact activity (for example more concentrated contact material or new contact material) or also with further elevated pressure; each of these measures could be used alone or all together.

The ratio of carbon monoxide to hydrogen in the gases fed to the first furnace group working with recycling can be kept at 1:2. However, a gas more rich in carbon monoxide may also advantageously be selected, thus obtaining better antiknock products. The outgoing gases of the first contact furnace group then naturally likewise contain a gas richer in carbon monoxide. As this gas is too poor in hydrogen for further conversion, it will preferably be corrected, for example by the admixture of hydrogen, before passing into the second contact furnace group working without recycling.

Instead of the arrangement in series of separate contact furnace systems, the recycling may also be restricted to one part of the furnace length in a single contact furnace, while only the second part of the furnace is operated without recycling.

I claim:

1. In a process for the catalytic conversion of gas mixtures containing carbon monoxide and hydrogen into hydrocarbons mainly of paraffinic and olefinic nature and containing more than two carbon atoms while maintaining temperatures below 300° C. with a catalyst suitable for forming benzine, hydrocarbon oil and paraffin from such gases at atmospheric pressure and at temperatures below 300° C., said catalyst containing a hydrogenating metal, an activator and a carrier substance, said carrier substance constituting the major portion of the catalyst, the step comprising performing said synthesis at pressures between 2 and 200 atmospheres in the presence of a catalyst having sufficiently low activity that, when carrying out such synthesis at atmospheric pressure and otherwise under the same conditions of reaction, the synthesis would yield below 100 g. of liquid and solid hydrocarbons per normal cubic metre of synthesis gas calculated on the basis of a gas containing a 100% carbon monoxide and hydrogen mixture.

2. In a process for the catalytic conversion of gas mixtures containing carbon monoxide and hydrogen into hydrocarbons mainly of paraffinic and olefinic nature and containing more than two carbon atoms while maintaining temperatures below 300° C. with a catalyst suitable for forming benzine, hydrocarbon oil and paraffin from such gases at atmospheric pressure and at temperatures below 300° C., said catalyst containing a hydrogenating metal, an activator and a carrier substance, said carrier substance constituting the major portion of the catalyst, the step comprising performing said synthesis at pressures between 2 and 200 atmospheres in the presence of a catalyst having sufficiently low activated metal content that, when carrying out such synthesis at atmospheric pressure and otherwise under the same conditions of reaction, the synthesis would yield below 100 g. of liquid and solid hydrocarbons per normal cubic metre of synthesis gas calculated on the basis of a gas containing a 100% carbon monoxide and hydrogen mixture.

3. In a process for the catalytic conversion of gas mixtures containing carbon monoxide and hydrogen into hydrocarbons mainly of paraffinic and olefinic nature and containing more than two carbon atoms while maintaining temperatures below 300° C. with a catalyst suitable for forming benzine, hydrocarbon oil and paraffin from such gases at atmospheric pressure and at temperatures below 300° C., said catalyst containing a hydrogenating metal, an activator and a carrier substance, said carrier substance constituting the major portion of the catalyst, the step comprising performing said synthesis at pressures between 2 and 200 atmospheres and with gas mixtures containing sufficiently diluted carbon monoxide and hydrogen that, when carrying out such synthesis at atmospheric pressure and otherwise under the same conditions of reaction, the synthesis would yield below 100 g. of liquid and solid hydrocarbons per normal cubic metre of synthesis gas calculated on the basis of a gas containing a 100% carbon monoxide and hydrogen mixture.

4. In a process for the catalytic conversion of gas mixtures containing carbon monoxide and hydrogen into hydrocarbons mainly of paraffinic and olefinic nature and containing more than two carbon atoms while maintaining temperatures below 300° C. with a catalyst suitable for forming benzine, hydrocarbon oil and paraffin from such gases at atmospheric pressure and at temperatures below 300° C., said catalyst containing a hydrogenating metal, an activator and a carrier substance, said carrier substance constituting the major portion of the catalyst, the step comprising performing said synthesis at pressures between 2 and 200 atmospheres in the presence of a catalyst having sufficiently low activated metal content and with gas mixtures containing sufficiently diluted carbon monoxide and hydrogen that, when carrying out such synthesis at atmospheric pressure and otherwise under the same conditions of reaction, the synthesis would yield below 100 g. of liquid and solid hydrocarbons per normal cubic metre of synthesis gas calculated on the basis of a gas containing a 100% carbon monoxide and hydrogen mixture.

5. In a process for the catalytic conversion of gas mixtures containing carbon monoxide and hydrogen into hydrocarbons mainly of paraffinic and olefinic nature and containing more than two carbon atoms while maintaining temperatures below 300° C. with a catalyst suitable for forming benzine, hydrocarbon oil and paraffin from such gases at atmospheric pressure and at temperatures below 300° C., said catalyst containing a hydrogenating metal, an activator and a carrier substance, said carrier substance constituting the major portion of the catalyst, the step comprising performing said synthesis at pressures between 2 and 200 atmospheres in the presence of a catalyst containing 0.5 to 50 grams of activated metal per litre of loose volume of the catalyst.

6. In a process for the catalytic conversion of gas mixtures containing carbon monoxide and hydrogen into hydrocarbons mainly of paraffinic and olefinic nature and containing more than two carbon atoms while maintaining temperatures below 300° C. with a catalyst suitable for forming benzine, hydrocarbon oil and paraffin from such gases at atmospheric pressure and at temperatures below 300° C., said catalyst containing a hydrogenating metal, an activator and a carrier substance, said carrier substance constituting the major portion of the catalyst, the step comprising performing said synthesis at pressures between 2 and 200 atmospheres in the presence of a catalyst containing less than 18% of an activator calculated with respect to the hydrogenating metal.

WILHELM HERBERT.